United States Patent
Amano et al.

(10) Patent No.: US 9,709,705 B2
(45) Date of Patent: Jul. 18, 2017

(54) ANTI-REFLECTION FILM AND OPTICAL ELEMENT HAVING THE SAME

(71) Applicant: CANON KABUSHIKI KAISHA, Tokyo (JP)

(72) Inventors: Sayoko Amano, Utsunomiya (JP); Yutaka Yamaguchi, Utsunomiya (JP); Kazuhiko Momoki, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 14/319,446

(22) Filed: Jun. 30, 2014

(65) Prior Publication Data
US 2015/0009570 A1 Jan. 8, 2015

(30) Foreign Application Priority Data
Jul. 3, 2013 (JP) .................................. 2013-139632

(51) Int. Cl.
*G02B 1/10* (2015.01)
*G02B 1/115* (2015.01)
*G02B 1/11* (2015.01)

(52) U.S. Cl.
CPC ................ *G02B 1/115* (2013.01); *G02B 1/11* (2013.01)

(58) Field of Classification Search
CPC .. G02B 1/10; G02B 1/11; G02B 1/113; G02B 1/115; G02B 5/20; G02B 5/28; G02B 5/285; G02B 5/289
USPC ........ 359/577, 580, 581, 586, 588, 589, 590
See application file for complete search history.

(56) References Cited

U.S. PATENT DOCUMENTS

| 2006/0203345 A1* | 9/2006 | Yonetani | G02B 21/16 359/586 |
| 2008/0002259 A1* | 1/2008 | Ishizawa | C03C 17/007 359/581 |
| 2010/0104838 A1* | 4/2010 | Noguchi | G02B 1/115 428/212 |
| 2012/0276350 A1* | 11/2012 | Terayama | G02B 1/115 428/212 |

(Continued)

FOREIGN PATENT DOCUMENTS

| JP | 2002-267801 A | 9/2002 |
| JP | 2004-294841 A | 10/2004 |
| JP | 2008-225210 A | 9/2008 |

(Continued)

*Primary Examiner* — Arnel C Lavarias
(74) *Attorney, Agent, or Firm* — Canon U.S.A. Inc., IP Division

(57) ABSTRACT

An anti-reflection film includes first through ninth layers. Regarding light having a wavelength of 550 nm, where the refractive indexes of the first through ninth layers are $n1$ through $n9$ respectively, the optical film thicknesses $d1$ through $d9$ (nm) respectively, and the maximum value of the difference in the refractive index between adjoining layers for layers 1 through 8 is $\Delta n$, the following conditions are satisfied.

$1.60 \leq n1 \leq 1.70$, $15$ nm$\leq d1 \leq 140$ nm, $2.00 \leq n2 \leq 2.40$, $20$ nm$\leq d2 \leq 120$ nm, $1.60 \leq n3 \leq 1.70$, $11$ nm$\leq d3 \leq 70$ nm, $2.00 \leq n4 \leq 2.40$, $20$ nm$\leq d4 \leq 165$ nm, $1.60 \leq n5 \leq 1.70$, $15$ nm$\leq d5 \leq 45$ nm, $2.00 \leq n6 \leq 2.40$, $90$ nm$\leq d6 \leq 175$ nm, $1.60 \leq n7 \leq 1.70$, $50$ nm$\leq d7 \leq 110$ nm, (Continued)

$2.00 \leq n8 \leq 2.40$, $20\ nm \leq d8 \leq 50\ nm$, $1.20 \leq n9 \leq 1.28$, $140\ nm \leq d9 \leq 160\ nm$, and $0.40 \leq \Delta n \leq 0.67$.

13 Claims, 12 Drawing Sheets

(56) References Cited

U.S. PATENT DOCUMENTS

| | | | | |
|---|---|---|---|---|
| 2013/0308196 A1* | 11/2013 | Koyama | ............... | G02B 1/115 359/601 |
| 2014/0078589 A1* | 3/2014 | Fujii | ............... | G02B 1/11 359/601 |

FOREIGN PATENT DOCUMENTS

| | | |
|---|---|---|
| JP | 2009-128820 A | 6/2009 |
| JP | 2010-72635 A | 4/2010 |
| JP | 2012-128135 A | 7/2012 |
| JP | 2012-141594 A | 7/2012 |

\* cited by examiner

ANTI-REFLECTION FILM AND OPTICAL ELEMENT HAVING THE SAME

BACKGROUND OF THE INVENTION

Field of the Invention

The present invention is related to an anti-reflection film and an optical element having the same, which is preferably used in an optical system such as a digital camera, video camera, or TV camera.

Description of the Related Art

Many optical elements such as lenses and filters included in optical systems are fabricated using transparent material (substrate) such as optical glass and optical plastic. If the refractive index for such substrate is increased, the reflectivity of the incident surface and the light exiting surface (light incident and exiting surface) also increases. If an optical element with a light incident and exiting surface having high reflectivity is used in an optical system, the effective amount of light reaching the image is reduced, while at the same time unwanted reflections from the light incident and exiting surface of the optical element enter the image plane and result in ghosting and flaring, which causes a reduction in the optical performance of the optical system. For this reason, an anti-reflection function is applied to the light incident surface of the optical element using a substrate.

Unwanted ghosting and flaring that reflect off the light incident and exiting surface and reach the imaging surface significantly change depending on the form of the optical element and the angle of incidence of light beams to the optical element. For this reason, the anti-reflection film applied to the substrate preferably obtains an excellent anti-reflective effect over a wavelength band as wide as possible at various angles of incidence. Multi-layered anti-reflection films with thin layers of dielectric film applied to the light incident and exiting surface of the substrate by deposition are common as the anti-reflection film applied to the light incident and exiting surface of the substrate. Generally, the anti-reflective effect of the anti-reflection film gradually increases and the wavelength band to prevent reflections widens with higher numbers of layers.

Conversely, if a material having a refractive index lower than the refractive index of 1.38 for magnesium fluoride is used as the material for the deposition film, for example, on the outermost layer of the anti-reflection film (outermost layer to the atmosphere), an anti-reflection function having high performance can be readily obtained. Japanese Patent Laid-Open No. 2012-141594 discloses the use of inorganic materials such as silica and magnesium fluoride and organic materials such as silicon resin and amorphous fluorine resin as materials having a low refractive index. These materials can lower the refractive index by forming voids in the layers. Japanese Patent Laid-Open No. 2012-141594 also proposes an anti-reflection film using a fluorine resin with a refractive index lowered by a factor of approximately 1.3 at wavelengths in a range between 400 to 700 nm.

An anti-reflection film with a 9-layer construction including a magnesium fluoride layer for the topmost layer is also proposed which further reduces the refractive index by a factor of approximately 1.2 at wavelengths in a range between 400 to 700 nm.

In order to reduce the refractive index for a wide band of wavelengths between 400 to 800 nm and obtain an excellent anti-reflection function, it is important to suitably set the refractive index of the substrate, the refractive index and the layer thickness of the thin layer material applied to the substrate, the number of layers, and so forth. Unsuitable configurations are unlikely to result in obtaining an excellent anti-reflective effect at wavelengths over a wide band.

SUMMARY OF THE INVENTION

It has been found desirable to provide an anti-reflection film having an excellent anti-reflective effect a wide-band of wavelengths and optical element having the same.

An anti-reflection film according to the present invention is formed on a substrate, and includes a first layer, a second layer, a third layer, a fourth layer, a fifth layer, a sixth layer, a seventh layer, an eighth layer, and a ninth layer disposed in order from the substrate side. Regarding light having a wavelength of 550 nm, assuming that the refractive index of the first layer is designated as n1 and the optical film thickness as d1 (nm), the refractive index of the second layer is designated as n2 and the optical film thickness as d2 (nm), the refractive index of the third layer is designated as n3 and the optical film thickness as d3 (nm), the refractive index of the fourth layer is designated as n4 and the optical film thickness as d4 (nm), the refractive index of the fifth layer is designated as n5 and the optical film thickness as d5 (nm), the refractive index of the sixth layer is designated as n6 and the optical film thickness as d6 (nm), the refractive index of the seventh layer is designated as n7 and the optical film thickness as d7 (nm), the refractive index of the eighth layer is designated as n8 and the optical film thickness as d8 (nm), the refractive index of the ninth layer is designated as n9 and the optical film thickness as d9 (nm), and the maximum value of the difference in the refractive index between adjoining layers for layers 1 through 8 is designated as $\Delta n$, the following conditions are satisfied.

$1.60 \leq n1 \leq 1.70$, $15 \text{ nm} \leq d1 \leq 140 \text{ nm}$, $2.00 \leq n2 \leq 2.40$, $20 \text{ nm} \leq d2 \leq 120 \text{ nm}$, $1.60 \leq n3 \leq 1.70$, $11 \text{ nm} \leq d3 \leq 70 \text{ nm}$, $2.00 \leq n4 \leq 2.40$, $20 \text{ nm} \leq d4 \leq 165 \text{ nm}$, $1.60 \leq n5 \leq 1.70$, $15 \text{ nm} \leq d5 \leq 45 \text{ nm}$, $2.00 \leq n6 \leq 2.40$, $90 \text{ nm} \leq d6 \leq 175 \text{ nm}$, $1.60 \leq n7 \leq 1.70$, $50 \text{ nm} \leq d7 \leq 110 \text{ nm}$, $2.00 \leq n8 \leq 2.40$, $20 \text{ nm} \leq d8 \leq 50 \text{ nm}$, $1.20 \leq n9 \leq 1.28$, $140 \text{ nm} \leq d9 \leq 160 \text{ nm}$, and $0.40 \leq \Delta n \leq 0.67$.

Further features of the present invention will become apparent from the following description of exemplary embodiments with reference to the attached drawings.

DESCRIPTION OF THE EMBODIMENTS

Hereinafter, embodiments of the present invention will be described in detail with reference to the attached drawings. The anti-reflection film according to the present invention is configured including 9 layers formed on at least one of the light incident surface and the light exiting surface of a substrate made from material with a refractive index nk corresponding to light of the reference wavelength (550 nm) is 1.48 to 2.15. The layers of the anti-reflection film are labeled from the substrate side to the atmosphere side as a first layer, second layer, third layer, fourth layer, fifth layer, sixth layer, seventh layer, eighth layer, and ninth layer. The refractive index for the reference wavelength, and the thickness of the optical film=(refractive index for the reference wavelength)×(thickness). At this time, the refractive index of each layer and the optical film thickness can be suitably set.

The maximum value for the reflectivity of the anti-reflection film when the angle of incidence is 0 degrees and the wavelength is in a range between 420 nm to 760 nm is no more than 0.1%.

Figure 1:
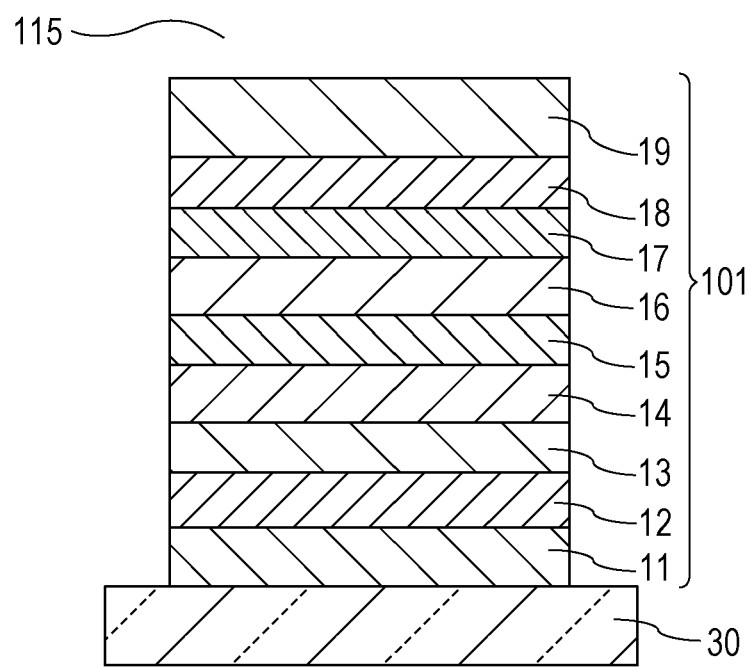
FIG. 1 is a cross-sectional schematic illustrating an embodiment of an optical element according to the present invention.
Figure 2A:
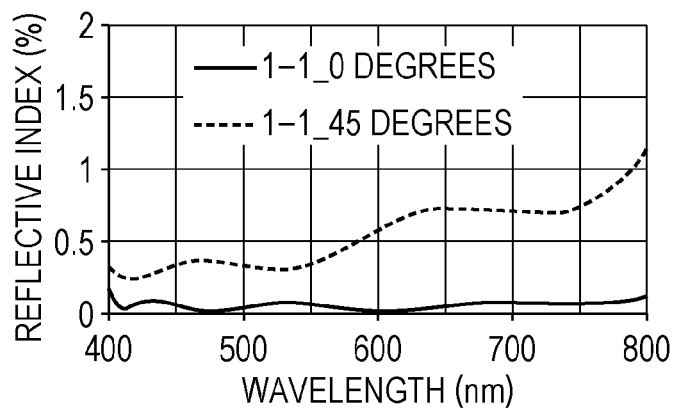
FIGS. 2A through 2H illustrate the reflectance characteristics of the optical element according to a First Embodiment of the present invention.
Figure 2B:
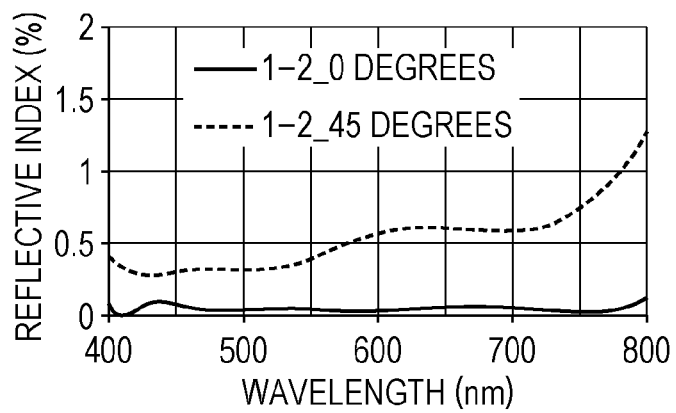
Figure 2C:
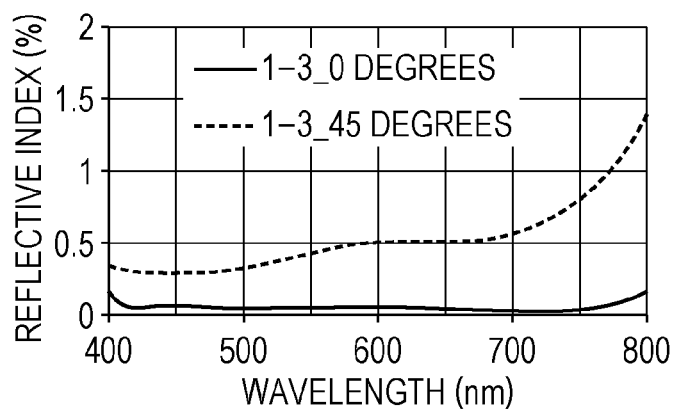
Figure 2D:
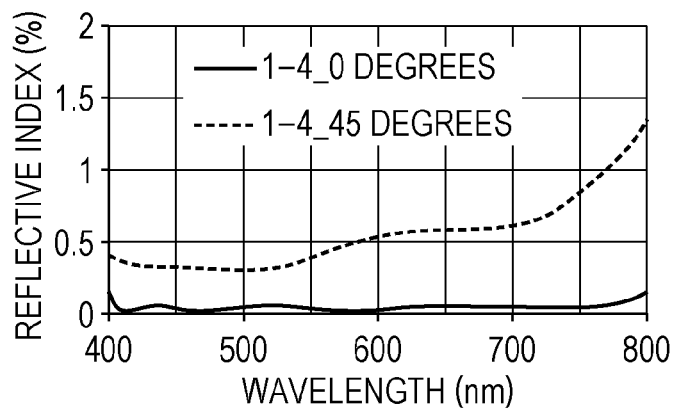
Figure 2E:
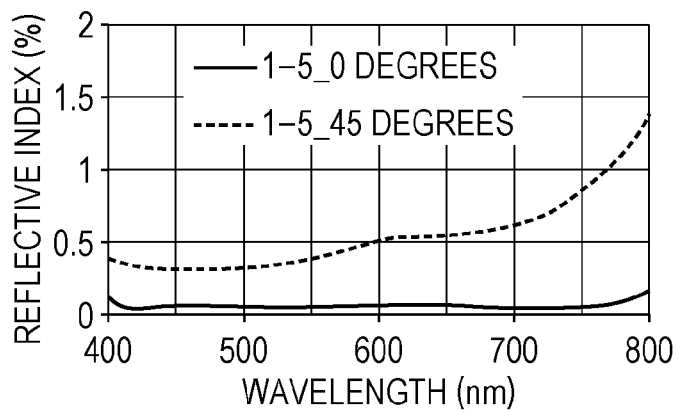
Figure 2F:
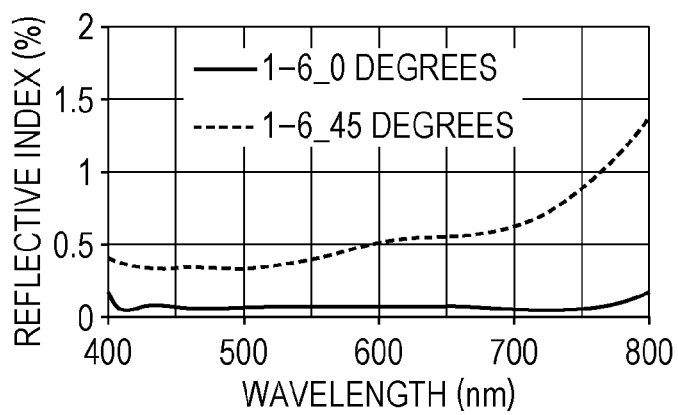
Figure 2G:
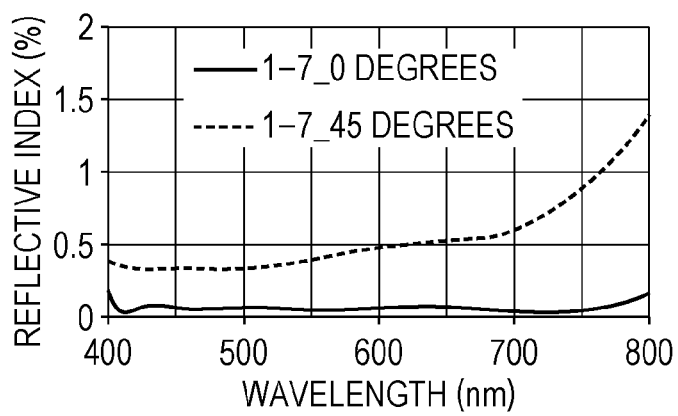
Figure 2H:
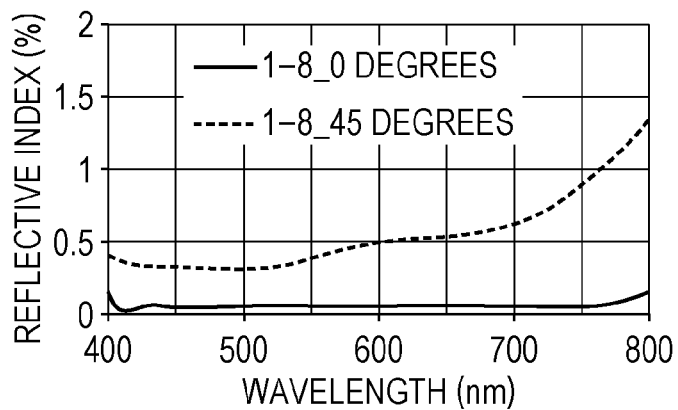

FIG. 1 is an explanatory diagram of an optical element including the anti-reflection film according to an embodiment of the present invention. FIG. 1 illustrates an optical element 100, a transparent substrate 30, an anti-reflection film 101, and an air layer 115. The optical element 100 is made from a lens, filter, or similar. The substrate 30 includes the anti-reflection film 101 on at least one side of the light incident and exiting surfaces. The anti-reflection film 101 is configured by consecutively layering thin films of a first layer 11 through a ninth layer 19 on the substrate 30 in order from the substrate 30 side to the air layer 115 side.

Regarding the anti-reflection film 101 of the present invention, the reference wavelength (design wavelength) λ is 550 nm. The refractive index nk of the material of the substrate 30 at the reference wavelength (hereinafter, referred to as the substrate refractive index) is 1.48≤nk≤2.15. The refractive index n1 of the material of the first layer 11 at the reference wavelength (hereinafter, referred to as the refractive index of the first layer 11) is 1.60≤n1≤1.70. An optical film thickness d1((refractive index for the reference wavelength)×(thickness)) is 15≤nm d1≤140 nm.

A refractive index n2 of the second layer 12 is 2.0≤n2≤2.40, and an optical film thickness d2 is 20 nm ≤d2≤120 nm. A refractive index n3 of the third layer 13 is 1.60≤n3≤1.70, and an optical film thickness d3 is 11 nm≤d3≤70 nm. A refractive index n4 of the fourth layer 14 is 2.0≤n4≤2.40, and an optical film thickness d4 is 20≤nm d4≤165 nm. A refractive index n5 of the fifth layer 15 is 1.60≤n5≤1.70, and an optical film thickness d5 is 15≤nm d5≤45 nm. A refractive index n6 of the sixth layer 16 is 2.0≤n6≤2.40, and an optical film thickness d6 is 90≤nm d6≤175 nm.

A refractive index n7 of the seventh layer 17 is 1.60≤n7≤1.70, and an optical film thickness d7 is 50 nm ≤d7≤110 nm. A refractive index n8 of the eighth layer 18 is 2.0≤n8≤2.40, and an optical film thickness d8 is 20 nm≤d8≤50 nm. A refractive index n9 of the ninth layer 19 is 1.20≤n9≤1.28, and an optical film thickness d9 is 140 nm≤d9≤160 nm.

The nine layers configuring the anti-reflection film include at least three types of layers made from materials that all have different refractive index values. One of these three layers is made from either a single oxide or a mixture of oxides from among titanium, tantalum, zirconium, chromium, niobium, cerium, hafnium, and yttrium, which results in a layer with a high refractive index between 2.00 to 2.40. Another layer is made from a single oxide alumina $Al_2O_3$ or a mixture (compound) containing this oxide, which results in a layer with a medium refractive index between 1.60 to 1.70. The last layer is made from a single oxide of silicon or a mixture containing this oxide, which results in a layer with a low refractive index between 1.20 to 1.28.

The first layer 11 makes contact with the substrate 30, and is susceptible to influence from the refractive index of the substrate 30. The refractive index n1 of the first layer 11 is preferably set to be less than the refractive index n2 of the second layer 12, so that the refractive index n1 of the first layer 11 and the refractive index n2 of the second layer 12 are in a relation of n1<n2. This enables reflectance sensitivity to be kept low. It is also preferable if the refractive index of each layer satisfies the following conditional expression.

$$n2>n3<n4>n5<n6>n7<n8>n9 \quad (1)$$

The conditional expression 1 represents the mutual relationship between the refractive index of the thin films. That is to say, the refractive index of the third layer 13 is lower than the refractive index of the second layer 12 and the fourth layer 14. It is preferable if the relationship between each layer is set as follows. The refractive index of the fifth layer 15 is lower than the refractive index of the fourth layer 14 and the sixth layer 16. The refractive index of the seventh layer 17 is lower than the refractive index of the sixth layer 16 and the eighth layer 18. The refractive index of the ninth layer 19 is lower than the refractive index of the eighth layer 18.

Giving the value of the maximum refractive index difference regarding the adjacent refractive index n1 of the first layer 11 to the refractive index n8 of the eighth layer 18 a designation of Δn, this is preferably kept within a range between 0.40≤Δn≤0.67. By setting the value within this range, it is possible to both widen the wavelength band with few ripples and lower the amount of reflections. If the optical film thickness from the first layer 11 to the ninth layer 19 is outside the set range, the wavelength band having an anti-reflective effect narrows, the anti-reflective performance degrades and angular characteristics are reduced such as an enlargement of the height of reflective ripples. For this reason, it is preferable to set the range as previously described.

The ninth layer 19, which is the topmost layer on the air 115 side, must reduce the refractive index, and so it should be a layer with a low refractive index made from material with a low refractive index such as $SiO_2$ or $MgF_2$. To further lower the refractive index, the ninth layer 19 is preferably a hollow fine particle of mostly silica. The main component must account for at least 50% of the total weight.

Hollow particles are bound by a binder. Hollow particles have voids (air holes) in the interior, which enables the refractive index to be lowered by the air in the voids (refractive index of 1.0). The air holes can either be a single-hole type or porous type, depending on the desired configuration. By having voids in the interior of the hollow fine particles, adsorption of moisture or impurities in the voids can be prevented. For this reason, environmental resistance is improved, and optical characteristics stable against large changes in the refractive index can be obtained.

The hollow fine particles must be bonded with a binder, and so it is preferable to manufacture this using the sol-gel process. The coating method is not restricted in particular, and any general coating method for liquid coating material may be used, such as dip coating, spin coating, spray coating, and roll coating. The thickness of the films applied to substrates having a curved surface such as a lens is preferably configured using spin coating for the coating material at this ensures uniformity of the film. A drying process is performed after the coating. A dryer, hot plate, or electric furnace can be used for the drying process. Drying conditions include the temperature and time that will allow the organic solvent in the hollow particles to evaporate without affecting the substrate.

It is generally preferable to use a temperature of no more than 300° C. Only one coating is preferable, but the drying and coating process may be repeated several times. The material for the first layer 11 to the eighth layer 18 is preferably configured from an inorganic membrane by sputtering or vacuum deposition for simplicity of deposition. The first layer 11 is preferably a layer (layer with a medium refractive index) made from one or a mixture of the following, lanthanum fluoride, cerium fluoride, neodymium fluoride, and aluminum oxide ($Al_2O_3$).

The second layer 12 and the eighth layer 18 are preferably layers (layers with a high refractive index) made from one or a mixture of the following oxides, titanium, tantalum, zirconium, chromium, niobium, cerium, hafnium, and yttrium. It is preferable to limit the number of materials configuring the layers. By limiting the number of materials configuring the layers, variances in processing can be reduced, which helps to stabilize the optical characteristics.

According to the present invention as previously described, an anti-reflection film having high-performing anti-reflective properties regarding wavelengths in a wide band between 400 to 800 nm can be obtained. Using this in an optical system can reduce the occurrence of ghosting and flare.

Hereafter, specific embodiments of the anti-reflection film according to the present invention will be described. However, these embodiments only serve as examples. The anti-reflection film according to the present invention is not limited to these configurations.

First Embodiment

According to the First Embodiment, an anti-reflection film having 9 layers as illustrated in FIG. 1 is manufactured on a substrate with a refractive index between 1.49 to 2.10. Table 1 illustrates the film configuration and optical film thickness. The numerical values in the table represent the optical film thickness in nanometers. The reference wavelength is 550 nm. The reference refractive index is the refractive index for the reference wavelength. An optical film thickness nd is calculated as follows.

Optical film thickness=(refractive index for the reference wavelength)×(thickness).

Embodiment 1-1 and Embodiment 1-8 illustrate changes in the optical film thickness of each layer and the refractive index of the substrate. Information on the other embodiments is organized in the same manner.

According to the present embodiment, the first layer through the eighth layer are formed by vacuum vapor deposition. The maximum difference in the refractive index Δn of adjoining layers between the first layer to the eighth layer is 0.54, which is achieved by configuring the layers using two types of material. The ninth layer is configured by using the spin coating process on a mixed solution of hollow $SiO_2$ prepared to have a refractive index of 1.25, and then drying for one hour.

FIGS. 2A through 2H illustrate the reflectance characteristics of Embodiment 1-1 through Embodiment 1-8 for a range of wavelengths between 400 to 800 nm regarding angles of incidence at 0 degrees and 45 degrees. The anti-reflection film according to Embodiment 1-1 through Embodiment 1-8 has a reflective index of no more than 0.2% for wavelengths in a range between 400 to 800 nm regarding an angle of incidence at 0 degrees, and a reflective index of no more than 0.1% for wavelengths in a range between 420 nm to 770 nm.

Regarding an angle of incidence of 45 degrees for wavelengths in a range between 400 to 750 nm, the reflective index is no more than 1.0%, and no more than 1.5% for wavelengths of 800 nm in all instances. Thus, the anti-reflection film according to the present embodiment has a high anti-reflective effect over a wide band of wavelengths, resulting in a high-performing anti-reflection film.

TABLE 1

| FILM CONFIGURATION | MATERIAL REFRACTIVE INDEX (λ = 550 nm) | OPTICAL FILM THICKNESS (nm) EMBODIMENT | | | | | | | |
|---|---|---|---|---|---|---|---|---|---|
| | | 1-1 | 1-2 | 1-3 | 1-4 | 1-5 | 1-6 | 1-7 | 1-8 |
| LAYER 9 | 1.25 | 145.4 | 146.8 | 146.8 | 149.4 | 150.7 | 151.5 | 153.6 | 153.3 |
| LAYER 8 | 2.20 | 34.6 | 32.5 | 30.7 | 32.8 | 30.4 | 29.8 | 25.6 | 25.2 |
| LAYER 7 | 1.66 | 69.5 | 79.3 | 81.7 | 84.6 | 91.0 | 93.1 | 107.3 | 107.0 |
| LAYER 6 | 2.20 | 158.4 | 120.2 | 111.9 | 117.2 | 108.2 | 107.6 | 90.7 | 92.5 |

TABLE 1-continued

| FILM CONFIGURATION | MATERIAL REFRACTIVE INDEX (λ = 550 nm) | OPTICAL FILM THICKNESS (nm) EMBODIMENT | | | | | | |
|---|---|---|---|---|---|---|---|---|
| | | 1-1 | 1-2 | 1-3 | 1-4 | 1-5 | 1-6 | 1-7 | 1-8 |
| LAYER 5 | 1.66 | 18.0 | 27.2 | 26.4 | 33.0 | 32.4 | 30.9 | 40.5 | 34.5 |
| LAYER 4 | 2.20 | 51.7 | 55.8 | 78.8 | 84.5 | 95.2 | 105.8 | 103.7 | 119.6 |
| LAYER 3 | 1.66 | 16.6 | 19.6 | 55.2 | 68.9 | 54.2 | 47.7 | 43.5 | 32.2 |
| LAYER 2 | 2.20 | 22.0 | 22.0 | 22.8 | 27.2 | 39.2 | 55.7 | 70.5 | 94.8 |
| LAYER 1 | 1.66 | 135.0 | 137.4 | 122.5 | 20.6 | 17.4 | 23.4 | 20.2 | 16.2 |
| REFERENCE REFRACTIVE INDEX | | 1.49 | 1.52 | 1.60 | 1.70 | 1.80 | 1.90 | 2.00 | 2.10 |

Second Embodiment

According to the Second Embodiment, an anti-reflection film having 9 layers as illustrated in FIG. 1 is manufactured on a substrate with a refractive index between 1.49 to 2.10. Table 2 illustrates the film configuration and film thickness. The numerical values in the table represent the optical film thickness in nanometers. The reference wavelength is 550 nm. For this case, the first layer to the eighth layer are formed by vacuum vapor deposition. The maximum difference in the refractive index Δn of adjoining layers between the first layer to the eighth layer is 0.54, which is achieved by configuring the layers using two types of material. The ninth layer is configured by using the spin coating process on a mixed solution of hollow SiO$_2$ prepared to have a refractive index of 1.22, and then drying for one hour.

Figure 3A:
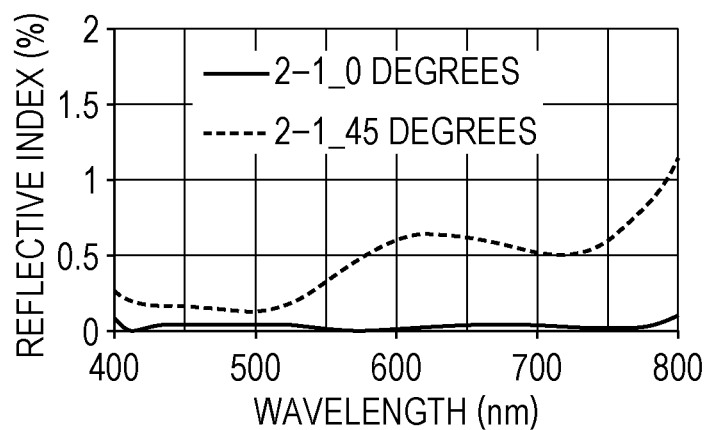
FIGS. 3A through 3C illustrate the reflectance characteristics of the optical element according to a Second Embodiment of the present invention.
Figure 3B:
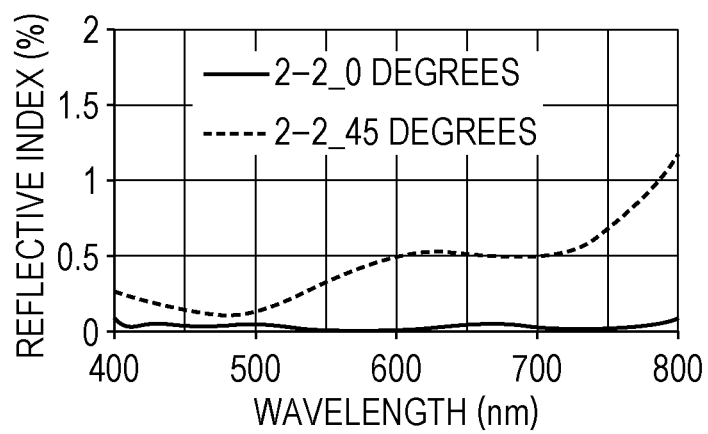
Figure 3C:
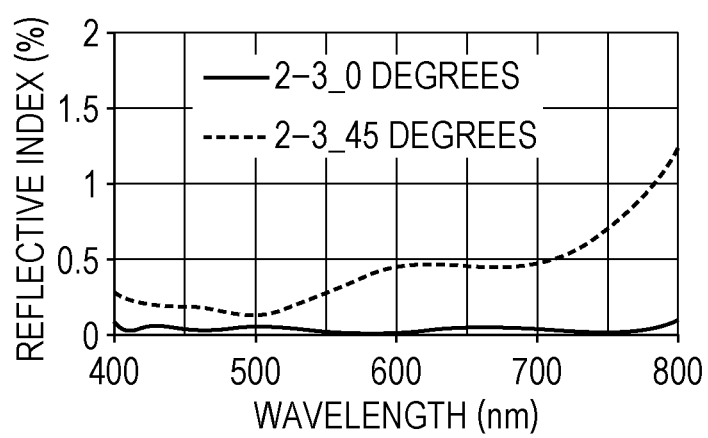

FIGS. 3A through 3C illustrate the reflectance characteristics of Embodiment 2-1 through Embodiment 2-3 for a range of wavelengths between 400 to 800 nm regarding angles of incidence at 0 degrees and 45 degrees. The anti-reflection film according to Embodiment 2-1 through Embodiment 2-3 has a reflective index of no more than 0.1% for wavelengths in a range between 400 to 800 nm regarding an angle of incidence at 0 degrees. Regarding an angle of incidence of 45 degrees for wavelengths in a range between 400 to 770 nm, the reflective index is no more than 1.0%, and no more than 1.5% for wavelengths of 800 nm in all instances. Thus, the anti-reflection film according to the present embodiment has a high anti-reflective effect over a wide band of wavelengths, resulting in a high-performing anti-reflection film.

TABLE 2

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 2-1 | 2-2 | 2-3 |
| LAYER 9 | 1.22 | 144.6 | 149.5 | 150.7 |
| LAYER 8 | 2.20 | 28.0 | 25.4 | 21.9 |
| LAYER 7 | 1.66 | 78.2 | 96.2 | 106.2 |
| LAYER 6 | 2.20 | 144.4 | 108.8 | 99.9 |
| LAYER 5 | 1.66 | 16.6 | 27.7 | 26.5 |
| LAYER 4 | 2.20 | 62.1 | 105.8 | 132.3 |
| LAYER 3 | 1.66 | 18.8 | 53.3 | 32.3 |
| LAYER 2 | 2.20 | 22.0 | 44.2 | 91.7 |
| LAYER 1 | 1.66 | 125.0 | 32.1 | 20.8 |
| REFERENCE REFRACTIVE INDEX | | 1.49 | 1.81 | 2.10 |

Third Embodiment

According to the Third Embodiment, an anti-reflection film having 9 layers as illustrated in FIG. 1 is manufactured on a substrate with a refractive index between 1.49 to 2.10. Table 3 illustrates the film configuration and film thickness. The numerical values in the table represent the optical film thickness in nanometers. The reference wavelength is 550 nm. For this case, the first layer to the eighth layer are formed by vacuum vapor deposition. The maximum difference in the refractive index Δn of adjoining layers between the first layer to the eighth layer is 0.54, which is achieved by configuring the layers using two types of material. The ninth layer is configured by using the spin coating process on a mixed solution of hollow SiO$_2$ prepared to have a refractive index of 1.27, and then drying for one hour.

Figure 4A:
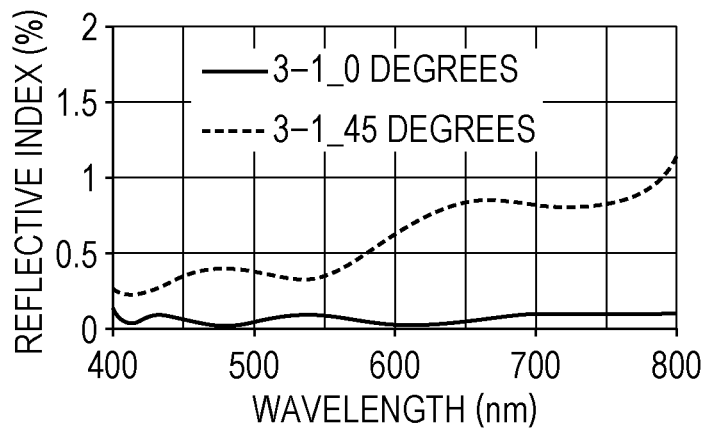
FIGS. 4A through 4C illustrate the reflectance characteristics of the optical element according to a Third Embodiment of the present invention.
Figure 4B:
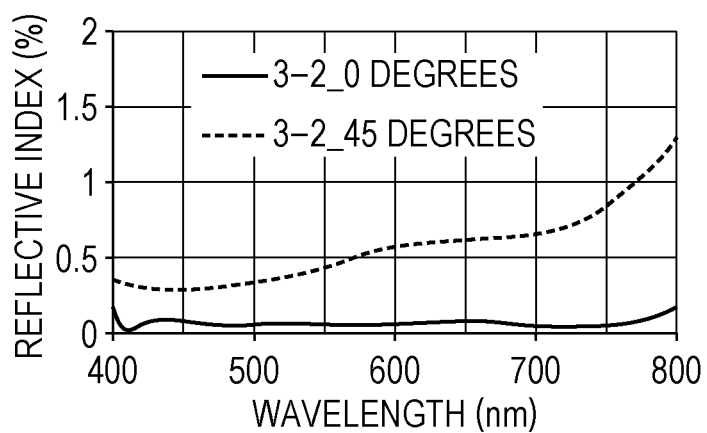
Figure 4C:
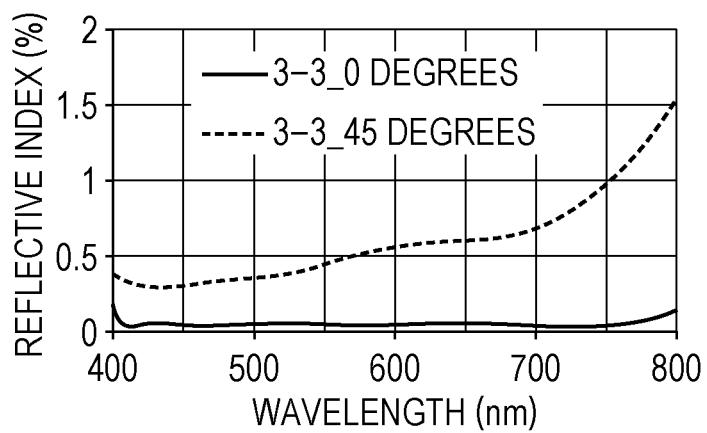

FIGS. 4A through 4C illustrate the reflectance characteristics of Embodiment 3-1 through Embodiment 3-3 for a range of wavelengths between 400 to 800 nm regarding angles of incidence at 0 degrees and 45 degrees. The anti-reflection film according to Embodiment 3-1 through Embodiment 3-3 has a reflective index of no more than 0.2% for wavelengths in a range between 400 to 800 nm regarding an angle of incidence at 0 degrees, and a reflective index of no more than 0.1% for wavelengths in a range between 420 nm to 770 nm. Regarding an angle of incidence of 45 degrees for wavelengths in a range between 400 to 750 nm, the reflective index is no more than 1.0%, and no more than 1.5% for wavelengths of 800 nm in all instances.

Thus, the anti-reflection film according to the present embodiment has a high anti-reflective effect over a wide band of wavelengths, resulting in a high-performing anti-reflection film. Compared to the First Embodiment and the Second Embodiment, if the refractive index of the ninth layer, which is the layer closest to air, is higher than 1.27, ripples are more likely to occur as the refractive index of the substrate is significantly lower. It is therefore preferable for the refractive index for the layer closest to air be no more than 1.28.

TABLE 3

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 3-1 | 3-2 | 3-3 |
| LAYER 9 | 1.27 | 145.2 | 149.7 | 150.2 |
| LAYER 8 | 2.20 | 38.1 | 36.7 | 35.8 |
| LAYER 7 | 1.66 | 63.1 | 74.2 | 76.6 |
| LAYER 6 | 2.20 | 163.2 | 134.2 | 128.5 |
| LAYER 5 | 1.66 | 19.5 | 22.7 | 16.5 |
| LAYER 4 | 2.20 | 48.9 | 100.3 | 137.0 |
| LAYER 3 | 1.66 | 16.3 | 51.9 | 28.7 |
| LAYER 2 | 2.20 | 22.0 | 39.6 | 93.5 |
| LAYER 1 | 1.66 | 136.6 | 16.6 | 16.6 |
| REFERENCE | | 1.49 | 1.81 | 2.10 |

TABLE 3-continued

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 3-1 | 3-2 | 3-3 |
| REFRACTIVE INDEX | | | | |

Fourth Embodiment

According to the Fourth Embodiment, an anti-reflection film having 9 layers as illustrated in FIG. 1 is manufactured on a substrate with a refractive index between 1.49 to 2.10. Table 4 illustrates the film configuration and film thickness. The numerical values in the table represent the optical film thickness in nanometers. The reference wavelength is 550 nm. For this case, the first layer to the eighth layer are formed by vacuum vapor deposition. The maximum difference in the refractive index Δn of adjoining layers between the first layer to the eighth layer is 0.54, which is achieved by configuring the layers using two types of material. The ninth layer is configured by using the spin coating process on a mixed solution of hollow $SiO_2$ prepared to have a refractive index of 1.20, and then drying for one hour.

Figure 5A:
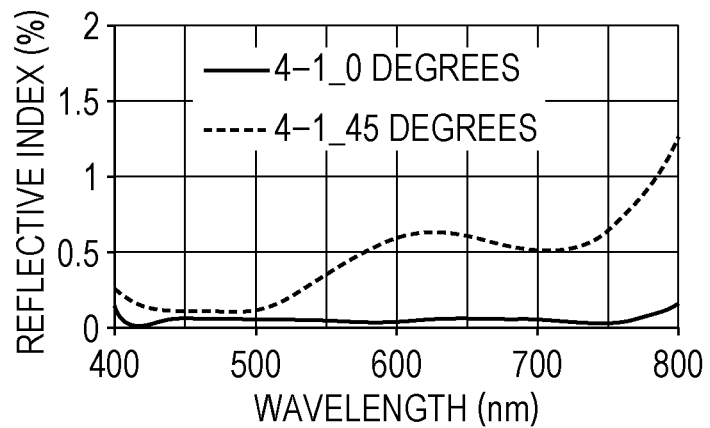
FIGS. 5A through 5C illustrate the reflectance characteristics of the optical element according to a Fourth Embodiment of the present invention.
Figure 5B:
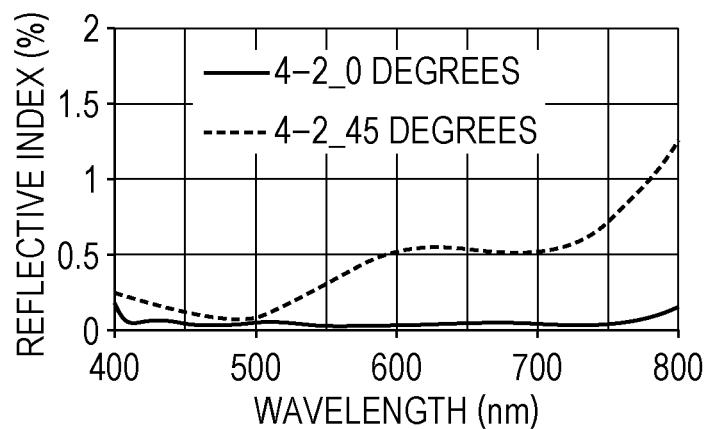
Figure 5C:
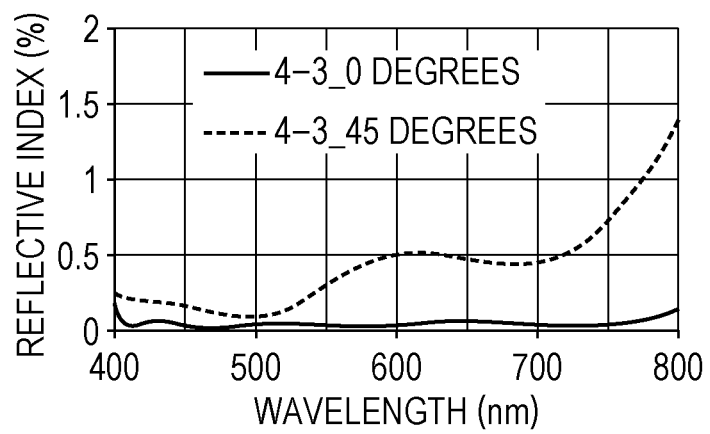

FIGS. 5A through 5C illustrate the reflectance characteristics of Embodiment 4-1 through Embodiment 4-3 for a range of wavelengths between 400 to 800 nm regarding angles of incidence at 0 degrees and 45 degrees. The anti-reflection film according to Embodiment 4-1 through Embodiment 4-3 has a reflective index of no more than 0.2% for wavelengths in a range between 400 to 800 nm regarding an angle of incidence at 0 degrees, and a reflective index of no more than 0.1% for wavelengths in a range between 420 nm to 780 nm. Regarding an angle of incidence of 45 degrees for wavelengths in a range between 400 to 770 nm, the reflective index is no more than 1.0%, and no more than 1.5% for wavelengths of 800 nm in all instances. Thus, the anti-reflection film according to the present embodiment has a high anti-reflective effect over a wide band of wavelengths, resulting in a high-performing anti-reflection film.

TABLE 4

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 4-1 | 4-2 | 4-3 |
| LAYER 9 | 1.20 | 145.1 | 149.0 | 149.1 |
| LAYER 8 | 2.20 | 25.0 | 23.2 | 21.7 |
| LAYER 7 | 1.66 | 84.0 | 99.6 | 103.7 |
| LAYER 6 | 2.20 | 139.1 | 111.3 | 109.9 |
| LAYER 5 | 1.66 | 16.6 | 26.3 | 22.1 |
| LAYER 4 | 2.20 | 66.8 | 109.3 | 136.6 |
| LAYER 3 | 1.66 | 20.1 | 53.8 | 35.9 |
| LAYER 2 | 2.20 | 22.0 | 45.6 | 87.9 |
| LAYER 1 | 1.66 | 123.7 | 36.4 | 25.9 |
| REFERENCE REFRACTIVE INDEX | | 1.49 | 1.81 | 2.10 |

Fifth Embodiment

According to the Fifth Embodiment, an anti-reflection film having 9 layers as illustrated in FIG. 1 is manufactured on a substrate with a refractive index between 1.49 to 2.10. Table 5 illustrates the film configuration and film thickness. The numerical values in the table represent the optical film thickness in nanometers. The reference wavelength is 550 nm. For this case, the first layer to the eighth layer are formed by vacuum vapor deposition. The maximum difference in the refractive index Δn of adjoining layers between the first layer to the eighth layer is 0.48, which is achieved by configuring the layers using two types of material. The ninth layer is configured by using the spin coating process on a mixed solution of hollow $SiO_2$ prepared to have a refractive index of 1.20, and then drying for one hour.

Figure 6A:
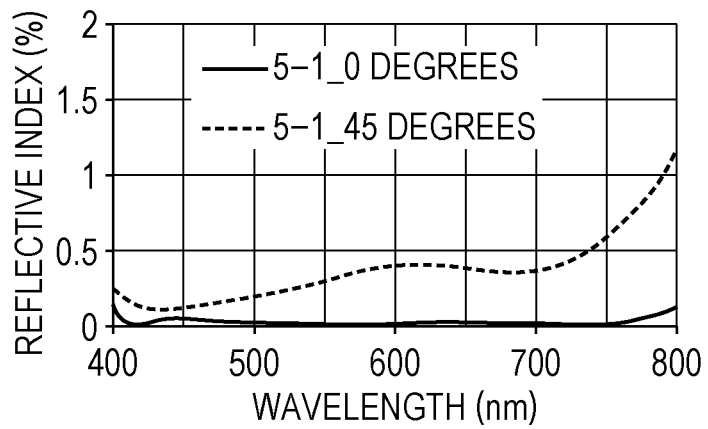
FIGS. 6A through 6C illustrate the reflectance characteristics of the optical element according to a Fifth Embodiment of the present invention.
Figure 6B:
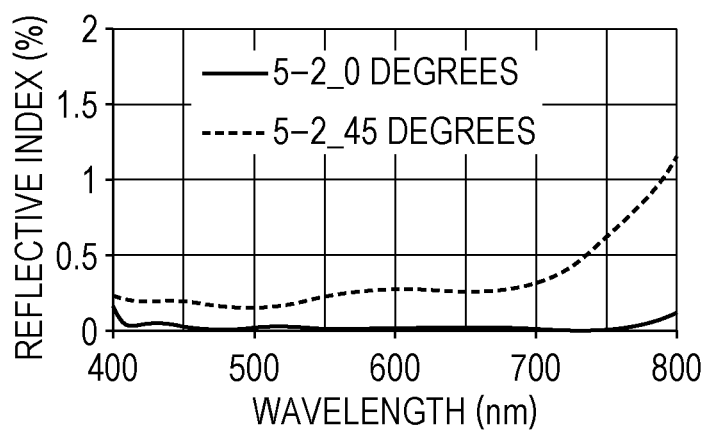
Figure 6C:
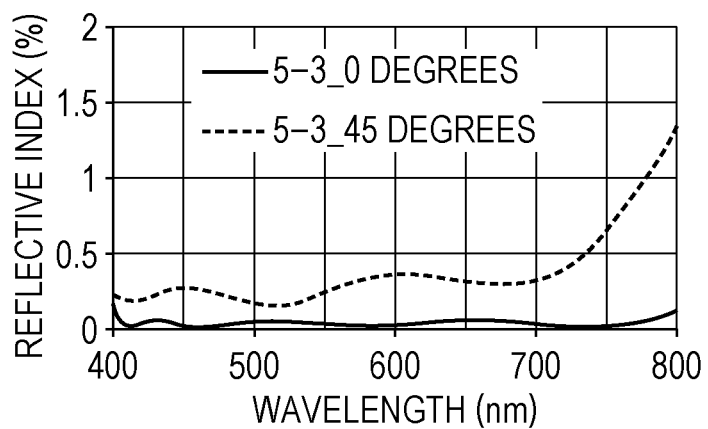

FIGS. 6A through 6C illustrate the reflectance characteristics of Embodiment 5-1 through Embodiment 5-3 for a range of wavelengths between 400 to 800 nm regarding angles of incidence at 0 degrees and 45 degrees. The anti-reflection film according to Embodiment 5-1 through Embodiment 5-3 has a reflective index of no more than 0.2% for wavelengths in a range between 400 to 800 nm regarding an angle of incidence at 0 degrees, and a reflective index of no more than 0.1% for wavelengths in a range between 420 nm to 780 nm. Regarding an angle of incidence of 45 degrees for wavelengths in a range between 400 to 770 nm, the reflective index is no more than 1.0%, and no more than 1.5% for wavelengths of 800 nm in all instances. Thus, the anti-reflection film according to the present embodiment has a high anti-reflective effect over a wide band of wavelengths, resulting in a high-performing anti-reflection film.

TABLE 5

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 5-1 | 5-2 | 5-3 |
| LAYER 9 | 1.20 | 145.1 | 151.8 | 149.6 |
| LAYER 8 | 2.09 | 25.9 | 22.7 | 21.1 |
| LAYER 7 | 1.61 | 84.5 | 102.0 | 107.4 |
| LAYER 6 | 2.09 | 133.7 | 113.7 | 107.8 |
| LAYER 5 | 1.61 | 16.1 | 25.8 | 25.4 |
| LAYER 4 | 2.09 | 73.6 | 108.7 | 130.2 |
| LAYER 3 | 1.61 | 30.0 | 51.3 | 32.5 |
| LAYER 2 | 2.09 | 20.9 | 53.3 | 111.3 |
| LAYER 1 | 1.61 | 124.7 | 29.6 | 18.4 |
| REFERENCE REFRACTIVE INDEX | | 1.49 | 1.81 | 2.10 |

Sixth Embodiment

According to the Sixth Embodiment, an anti-reflection film having 9 layers as illustrated in FIG. 1 is manufactured on a substrate with a refractive index between 1.49 to 2.10. Table 6 illustrates the film configuration and film thickness. The numerical values in the table represent the optical film thickness in nanometers. The reference wavelength is 550 nm. For this case, the sixth layer to the eighth layer are formed by vacuum vapor deposition. The maximum difference in the refractive index Δn of adjoining layers between the first layer to the eighth layer is 0.48, which is achieved by configuring the layers using two types of material. The ninth layer is configured by using the spin coating process on a mixed solution of hollow $SiO_2$ prepared to have a refractive index of 1.20, and then drying for one hour.

Figure 7A:
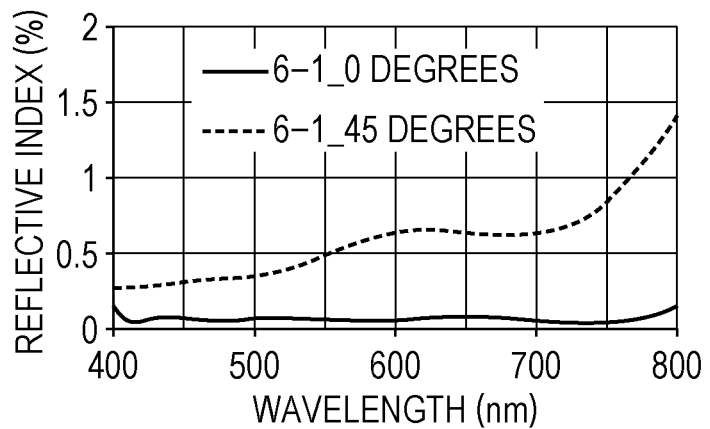
FIGS. 7A through 7C illustrate the reflectance characteristics according of the optical element to a Sixth Embodiment of the present invention.
Figure 7B:
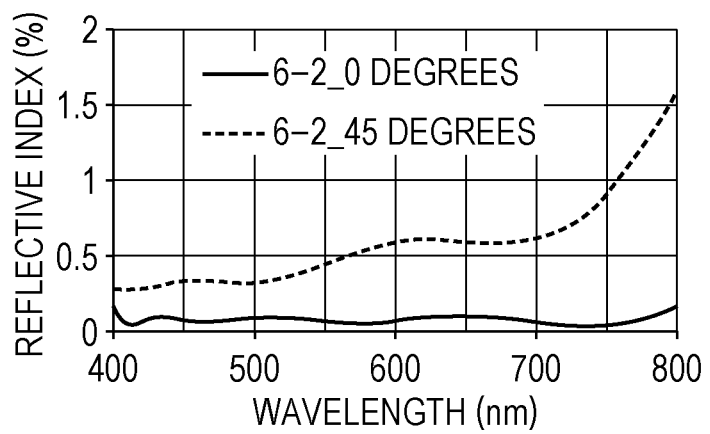
Figure 7C:
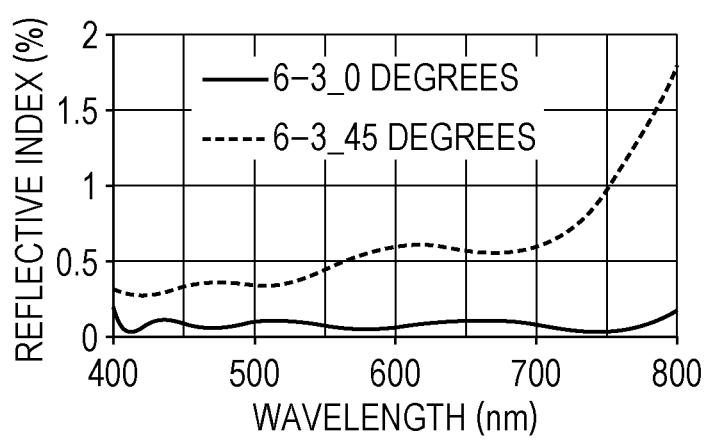

FIGS. 7A through 7C illustrate the reflectance characteristics of Embodiment 6-1 through Embodiment 6-3 for a range of wavelengths between 400 to 800 nm regarding angles of incidence at 0 degrees and 45 degrees. The anti-reflection film according to Embodiment 6-1 through Embodiment 6-3 has a reflective index of no more than 0.2% for wavelengths in a range between 400 to 800 nm regarding an angle of incidence at 0 degrees, and a reflective index of no more than 0.1% for wavelengths in a range between 420 nm to 780 nm. Regarding an angle of incidence of 45 degrees for wavelengths in a range between 400 to 750 nm, the reflective index is no more than 1.0%, and no more than 1.8% for wavelengths of 800 nm in all instances.

Thus, the anti-reflection film according to the present embodiment has a high anti-reflective effect over a wide band of wavelengths, resulting in a high-performing anti-reflection film. Regarding the reflectance characteristics as in FIGS. 7A through 7C, when the maximum difference for the refractive index Δn is small, ripples are more likely to occur as the refractive index of the substrate increases. It is therefore preferable for the maximum difference for the refractive index Δn to be at least 0.40.

TABLE 6

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 6-1 | 6-2 | 6-3 |
| LAYER 9 | 1.27 | 144.3 | 147.0 | 147.6 |
| LAYER 8 | 2.09 | 42.7 | 42.6 | 42.6 |
| LAYER 7 | 1.61 | 55.6 | 58.7 | 60.6 |
| LAYER 6 | 2.09 | 155.3 | 174.6 | 168.9 |
| LAYER 5 | 1.61 | 16.2 | 21.7 | 15.8 |
| LAYER 4 | 2.09 | 20.9 | 88.8 | 115.9 |
| LAYER 3 | 1.61 | 16.5 | 58.5 | 32.0 |
| LAYER 2 | 2.09 | 42.8 | 49.4 | 108.6 |
| LAYER 1 | 1.61 | 139.6 | 34.8 | 15.8 |
| REFERENCE REFRACTIVE INDEX | | 1.49 | 1.81 | 2.10 |

Seventh Embodiment

According to the Seventh Embodiment, an anti-reflection film having 9 layers as illustrated in FIG. 1 is manufactured on a substrate with a refractive index between 1.49 to 2.10. Table 7 illustrates the film configuration and film thickness. The numerical values in the table represent the optical film thickness in nanometers. The reference wavelength is 550 nm. For this case, the first layer to the eighth layer are formed by vacuum vapor deposition. The maximum difference in the refractive index Δn of adjoining layers between the first layer to the eighth layer is 0.66, which is achieved by configuring the layers using two types of material. The ninth layer is configured by using the spin coating process on a mixed solution of hollow SiO₂ prepared to have a refractive index of 1.27, and then drying for one hour.

Figure 8A:
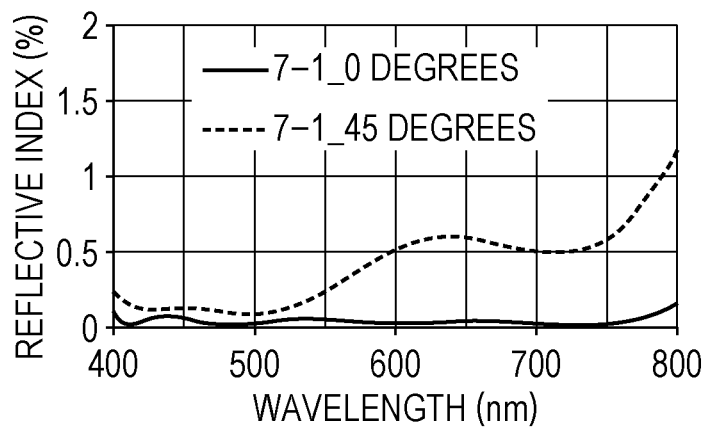
FIGS. 8A through 8C illustrate the reflectance characteristics of the optical element according to a Seventh Embodiment of the present invention.
Figure 8B:
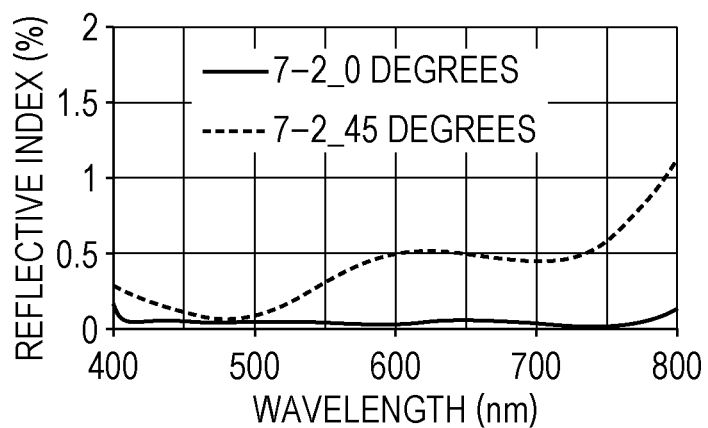
Figure 8C:
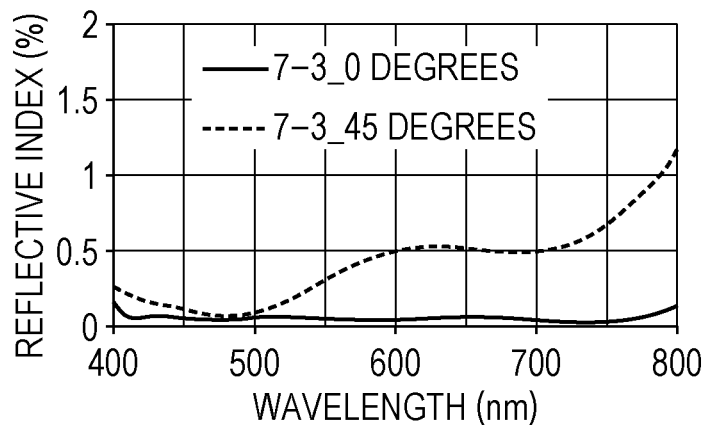

FIGS. 8A through 8C illustrate the reflectance characteristics of Embodiment 7-1 through Embodiment 7-3 for a range of wavelengths between 400 to 800 nm regarding angles of incidence at 0 degrees and 45 degrees. The anti-reflection film according to Embodiment 7-1 through Embodiment 7-3 has a reflective index of no more than 0.2% for wavelengths in a range between 400 to 800 nm regarding an angle of incidence at 0 degrees, and a reflective index of no more than 0.1% for wavelengths in a range between 420 nm to 780 nm. Regarding an angle of incidence of 45 degrees for wavelengths in a range between 400 to 770 nm, the reflective index is no more than 1.0%, and no more than 1.5% for wavelengths of 800 nm in all instances. Thus, the anti-reflection film according to the present embodiment has a high anti-reflective effect over a wide band of wavelengths, resulting in a high-performing anti-reflection film.

TABLE 7

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 7-1 | 7-2 | 7-3 |
| LAYER 9 | 1.20 | 146.5 | 149.8 | 148.9 |
| LAYER 8 | 2.34 | 22.7 | 21.2 | 20.0 |
| LAYER 7 | 1.68 | 88.9 | 102.1 | 101.8 |
| LAYER 6 | 2.34 | 121.0 | 105.6 | 99.9 |
| LAYER 5 | 1.68 | 17.0 | 26.7 | 15.3 |
| LAYER 4 | 2.34 | 79.5 | 107.9 | 160.1 |
| LAYER 3 | 1.68 | 28.6 | 54.0 | 28.7 |
| LAYER 2 | 2.34 | 23.6 | 40.1 | 76.2 |
| LAYER 1 | 1.68 | 121.1 | 32.3 | 22.2 |
| REFERENCE REFRACTIVE INDEX | | 1.49 | 1.81 | 2.10 |

Eighth Embodiment

According to the Eighth Embodiment, an anti-reflection film having 9 layers as illustrated in FIG. 1 is manufactured on a substrate with a refractive index between 1.49 to 2.10. Table 8 illustrates the film configuration and film thickness. The numerical values in the table represent the optical film thickness in nanometers. The reference wavelength is 550 nm. For this case, the first layer to the eighth layer are formed by vacuum vapor deposition. The maximum difference in the refractive index Δn of adjoining layers between the first layer to the eighth layer is 0.66, which is achieved by configuring the layers using two types of material. The ninth layer is configured by using the spin coating process on a mixed solution of hollow SiO₂ prepared to have a refractive index of 1.27, and then drying for one hour.

Figure 9A:
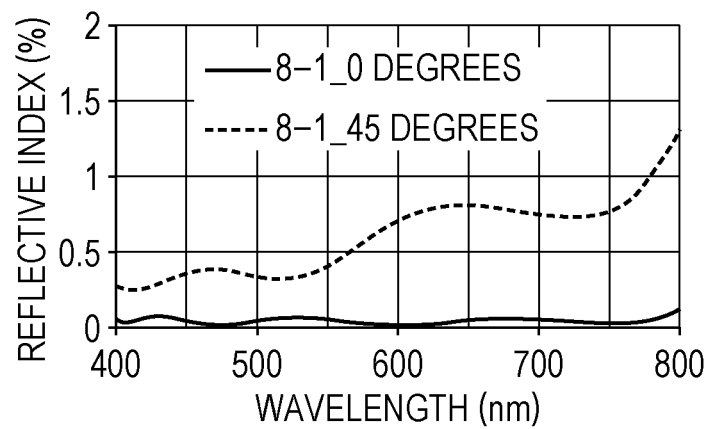
FIGS. 9A through 9C illustrate the reflectance characteristics of the optical element according to an Eighth Embodiment of the present invention.
Figure 9B:
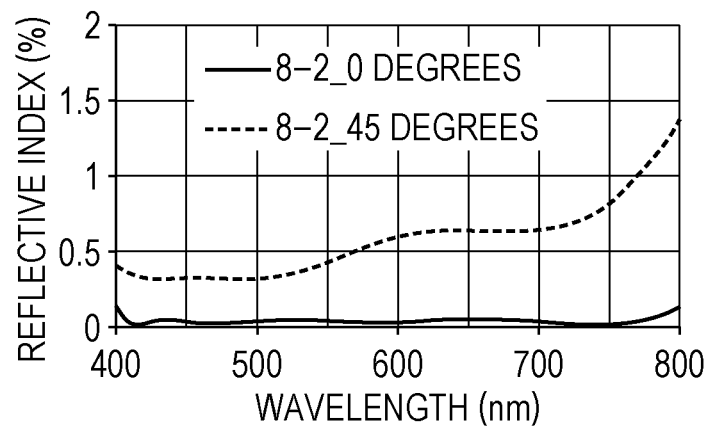
Figure 9C:
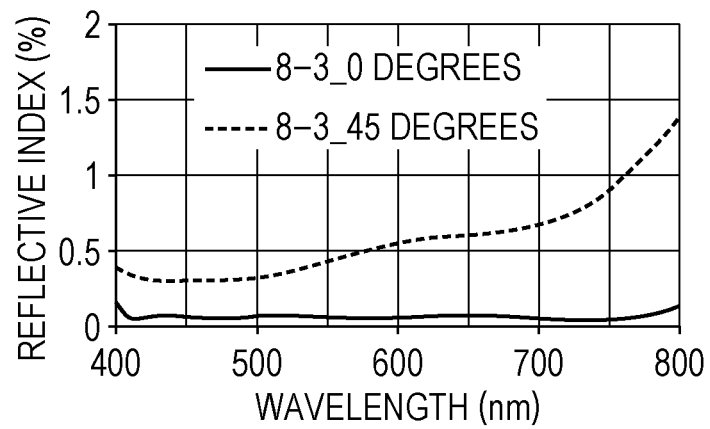

FIGS. 9A through 9C illustrate the reflectance characteristics of Embodiment 8-1 through Embodiment 8-3 for a range of wavelengths between 400 to 800 nm regarding angles of incidence at 0 degrees and 45 degrees. The anti-reflection film according to Embodiment 8-1 through Embodiment 8-3 has a reflective index of no more than 0.2% for wavelengths in a range between 400 to 800 nm regarding an angle of incidence at 0 degrees, and a reflective index of no more than 0.1% for wavelengths in a range between 420 nm to 780 nm. Regarding an angle of incidence of 45 degrees for wavelengths in a range between 400 to 770 nm, the reflective index is no more than 1.0%, and no more than 1.5% for wavelengths of 800 nm in all instances.

Thus, the anti-reflection film according to the present embodiment has a high anti-reflective effect over a wide band of wavelengths, resulting in a high-performing anti-reflection film. Regarding the reflectance characteristics as in FIGS. 9A through 9C, when the maximum difference for the refractive index Δn is large, ripples are more likely to occur as the refractive index of the material of the substrate decreases. It is therefore preferable for the maximum difference for the refractive index Δn to be no more than 0.67.

TABLE 8

| FILM CONFIGURATION | MATERIAL REFRACTIVE INDEX (λ = 550 nm) | OPTICAL FILM THICKNESS (nm) EMBODIMENT | | |
|---|---|---|---|---|
| | | 8-1 | 8-2 | 8-3 |
| LAYER 9 | 1.27 | 142.5 | 148.3 | 150.3 |
| LAYER 8 | 2.34 | 35.9 | 35.8 | 33.0 |
| LAYER 7 | 1.68 | 61.5 | 72.2 | 79.5 |
| LAYER 6 | 2.34 | 169.8 | 138.0 | 119.1 |

TABLE 8-continued

| FILM CONFIGURATION | MATERIAL REFRACTIVE INDEX ($\lambda$ = 550 nm) | OPTICAL FILM THICKNESS (nm) EMBODIMENT | | |
|---|---|---|---|---|
| | | 8-1 | 8-2 | 8-3 |
| LAYER 5 | 1.68 | 18.0 | 21.5 | 17.3 |
| LAYER 4 | 2.34 | 41.7 | 96.4 | 132.6 |
| LAYER 3 | 1.68 | 11.1 | 55.7 | 31.6 |
| LAYER 2 | 2.34 | 23.6 | 35.1 | 75.3 |
| LAYER 1 | 1.68 | 134.7 | 17.8 | 18.6 |
| REFERENCE REFRACTIVE INDEX | | 1.49 | 1.81 | 2.10 |

Figure 10:
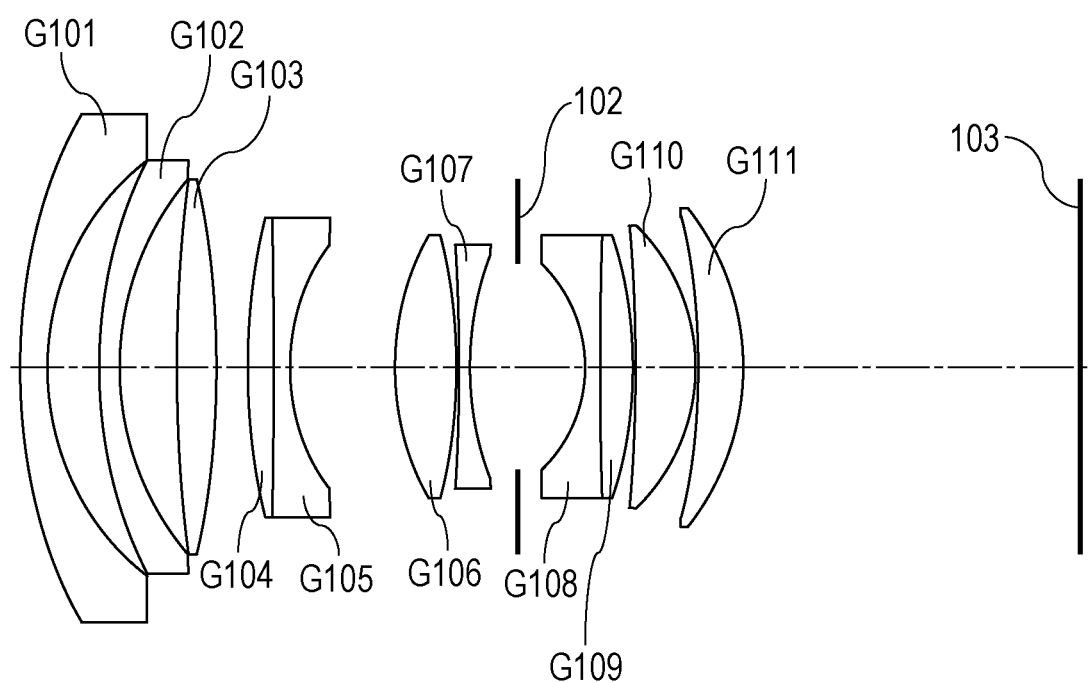
FIG. 10 is a cross-sectional diagram illustrating an imaging optical system using the optical element having the anti-reflection film according to the present invention.

FIG. 10 is an overview schematic diagram of the optical element including the anti-reflection film according to the present invention and an imaging optical system using the same. FIG. 10 illustrates an imaging optical system 300, which uses optical devices such as a digital camera, video camera, and an interchangeable lens. The imaging optical system 300 illustrated has a single focal length, but it may also have a zoom lens. FIG. 10 illustrates an imaging surface 103 in which solid-state imaging elements (photoelectric conversion elements) such as CCD sensors or CMOS sensors are disposed, and a variable diaphragm 102. Lenses G101 through G111 are optical elements. The anti-reflection film configured as previously described is applied to at least one side regarding the light incident surface or the light exiting surface of at least one of the optical elements regarding these lenses.

Hereafter, the numerical embodiments of the optical system 300 according to the present invention will be described. Regarding these numerical embodiments, i represents the sequence of surfaces from the object side, ri represents the curvature radius of the i'th surface from the object side, and di represents the interval between the i'th and the i+1'th from the object side. Further, ndi and vdi represent the refractive index and the Abbe number for the i'th optical element. Moreover, f represents the focal distance, FNO represents the F number, and ω represents the half field angle (in degrees).

Numerical Embodiments
f = 24.4 F No = 1.45 ω = 41.4°

| r01 = 60.187 | d01 = 2.80 | n1 = 1.69680 | v1 = 55.5 |
|---|---|---|---|
| r02 = 30.193 | d02 = 6.19 | | |
| r03 = 59.602 | d03 = 2.30 | n2 = 1.69680 | v2 = 55.5 |
| r04 = 91.983 | d04 = 6.55 | | |
| r05 = 194.761 | d05 = 4.53 | n3 = 1.67790 | v3 = 55.3 |
| r06 = −97.779 | d06 = 3.68 | | |
| r07 = 80.907 | d07 = 2.80 | n4 = 1.84666 | v4 = 23.9 |
| r08 = 666.220 | d08 = 1.70 | n5 = 1.49700 | v5 = 81.6 |
| r09 = 23.755 | d09 = 11.64 | | |
| r10 = 31.225 | d10 = 7.37 | n6 = 1.80400 | v6 = 46.6 |
| r11 = −57.233 | d11 = 0.15 | | |
| r12 = −409.276 | d12 = 1.89 | n7 = 1.71736 | v7 = 29.5 |
| r13 = 39.492 | d13 = 5.04 | | |
| r14 = ∞ | d14 = 8.18 | | |
| r15 = −16.104 | d15 = 1.50 | n8 = 1.80518 | v8 = 25.4 |
| r16 = 2532.956 | d16 = 3.47 | n9 = 1.83481 | v9 = 42.7 |
| r17 = −34.039 | d17 = 0.15 | | |
| r18 = −190.746 | d18 = 7.01 | n10 = 1.61800 | v10 = 63.4 |
| r19 = −23.481 | d19 = 0.15 | | |
| r20 = −74.015 | d20 = 5.10 | n11 = 1.77250 | v11 = 49.6 |
| r21 = −29.342 | | | |

The previously described numerical embodiments are only representative examples. Various changes and modifications to these embodiment are possible when implementing the present invention. Hereafter, comparative examples regarding the anti-reflection film according to the present invention will be described.

COMPARATIVE EXAMPLE 1

As the Comparative Example 1 of the present invention, the anti-reflection film configured as illustrated in Table 9 is manufactured on a substrate with a refractive index of 1.49 ($\lambda$=550). For this case, the first layer to the eighth layer are formed by vacuum vapor deposition. The maximum difference in the refractive index Δn of adjoining layers between the first layer to the eighth layer is 0.54, which is achieved by configuring the layers using two types of material. The ninth layer is configured by using the spin coating process on a mixed solution of hollow $SiO_2$ prepared to have a refractive index of 1.30 (for wavelength $\lambda$=550 nm), and then drying for one hour.

Figure 11:
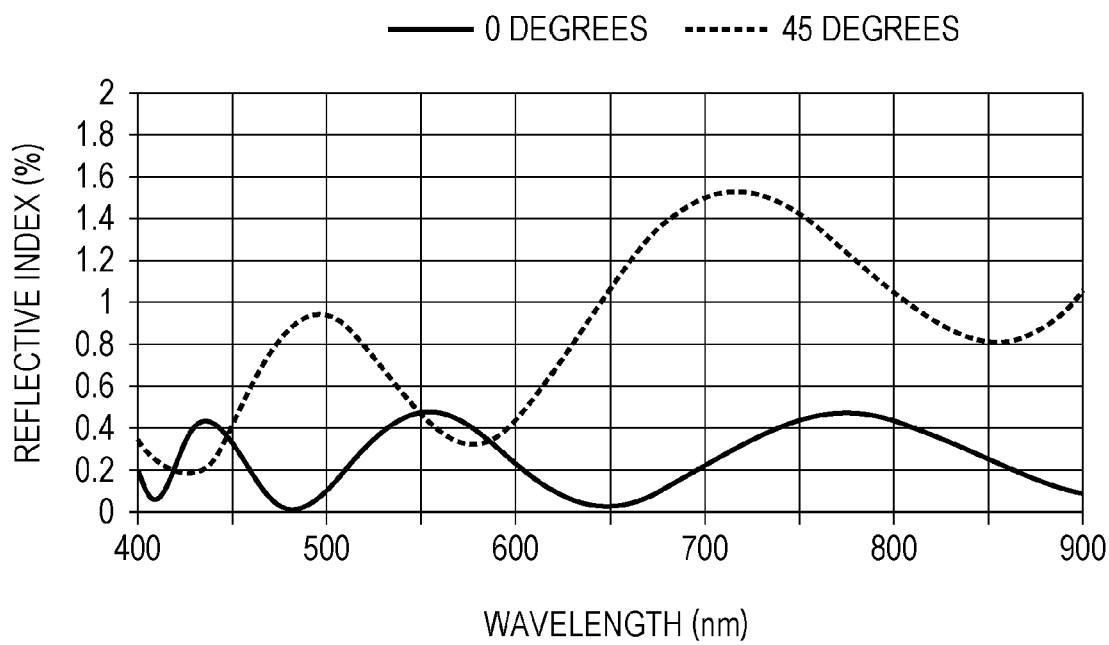
FIG. 11 illustrates the reflectance characteristics of the optical element according to a First Comparative Example.

FIG. 11 illustrates the reflectance characteristics for a range of wavelengths between 400 to 800 nm regarding angles of incidence at 0 degrees and 45 degrees. The anti-reflection film according to Comparative Example 1 has a reflective index of at least 0.2% for wavelengths in a range between 400 to 800 nm regarding an angle of incidence at 0 degrees, and a reflective index of at least 0.1% for wavelengths in a range between 420 nm to 720 nm. Regarding an angle of incidence of 45 degrees for wavelengths of 800 nm, the reflective index is 2.0% resulting in large ripples. Thus, the anti-reflective characteristics can be confirmed to be degraded in comparison with the anti-reflection film according to the present invention.

TABLE 9

| | MATERIAL REFRACTIVE INDEX ($\lambda$ = 550 nm) | OPTICAL FILM THICKNESS (nm) |
|---|---|---|
| LAYER 9 | 1.30 | 127.5 |
| LAYER 8 | 2.20 | 33.1 |
| LAYER 7 | 1.66 | 57.1 |
| LAYER 6 | 2.20 | 135.0 |
| LAYER 5 | 1.66 | 16.6 |
| LAYER 4 | 2.20 | 51.6 |
| LAYER 3 | 1.66 | 16.6 |
| LAYER 2 | 2.20 | 22.0 |
| LAYER 1 | 1.66 | 125.9 |
| REFERENCE | 1.49 | |

COMPARATIVE EXAMPLE 2

As the Comparative Example 2 of the present invention, the anti-reflection film configured as illustrated in Table 10 is manufactured on a substrate with a refractive index of 2.00 ($\lambda$=550). For this case, the first layer to the eighth layer are formed by vacuum vapor deposition. The maximum difference in the refractive index Δn of adjoining layers between the first layer to the eighth layer is 0.84, which is achieved by configuring the layers using three types of material. The ninth layer is configured by using the spin coating process on a mixed solution of hollow $SiO_2$ prepared to have a refractive index of 1.25 ($\lambda$=550 nm), and then drying for one hour.

Figure 12:
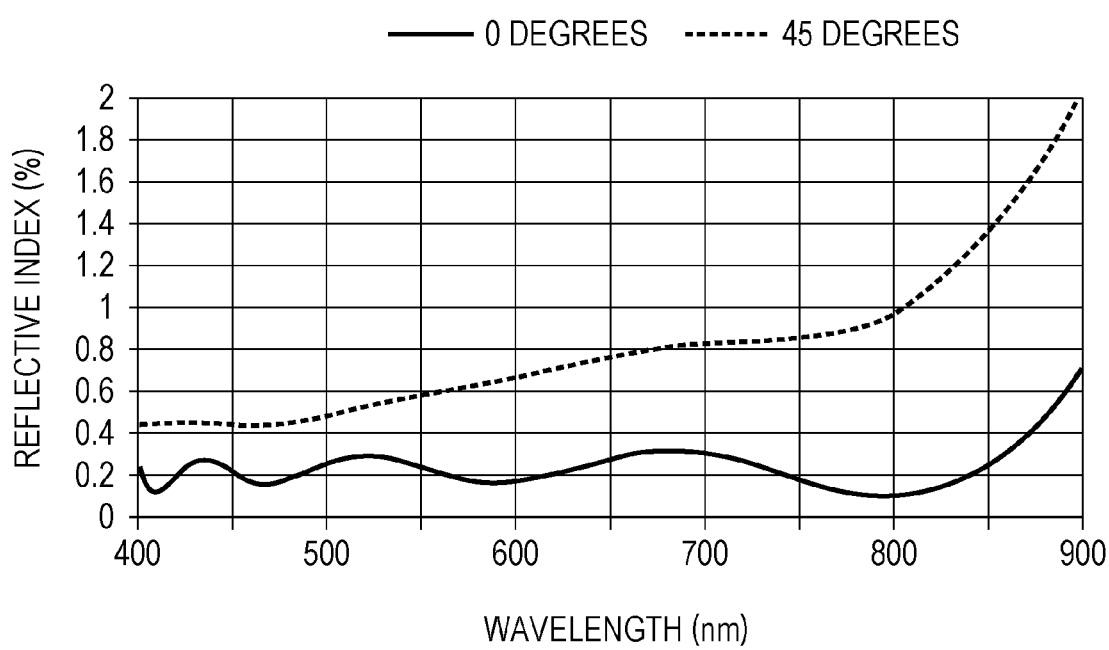
FIG. 12 illustrates the reflectance characteristics of the optical element according to a Second Comparative Example.

FIG. 12 illustrates the reflectance characteristics for a range of wavelengths between 400 to 800 nm regarding angles of incidence at 0 degrees and 45 degrees. The anti-reflection film according to Comparative Example 2 has a reflective index of at least 0.2% for wavelengths in a range between 400 to 800 nm regarding an angle of incidence at 0 degrees, and a reflective index of at least 1.0% for wavelengths of 630 nm even for an angle of incidence at 45 degrees, which results in large ripples. Thus, the anti-reflective characteristics can be confirmed to be degraded in comparison with the anti-reflection film according to the present invention.

TABLE 10

|  | MATERIAL REFRACTIVE INDEX (λ = 550 nm) | OPTICAL FILM THICKNESS (nm) |
| --- | --- | --- |
| LAYER 9 | 1.25 | 148.1 |
| LAYER 8 | 2.30 | 45.2 |
| LAYER 7 | 1.46 | 49.0 |
| LAYER 6 | 2.30 | 132.9 |
| LAYER 5 | 1.46 | 12.2 |
| LAYER 4 | 2.30 | 68.4 |
| LAYER 3 | 1.46 | 14.0 |
| LAYER 2 | 2.30 | 37.0 |
| LAYER 1 | 1.78 | 267.8 |
| REFERENCE | 2.00 | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-139632, filed Jul. 3, 2013, which is hereby incorporated by reference herein in its entirety.

What is claimed is:

1. An anti-reflection film formed on a substrate, the anti-reflection film comprising:
a first layer, a second layer, a third layer, a fourth layer, a fifth layer, a sixth layer, a seventh layer, an eighth layer, and a ninth layer disposed in order from the substrate, wherein regarding light having a wavelength of 550 nm, assuming that
a refractive index of the first layer is designated as $n1$ and an optical film thickness of the first layer is designated as $d1$ (nm),
a refractive index of the second layer is designated as $n2$ and an optical film thickness of the second layer is designated as $d2$ (nm),
a refractive index of the third layer is designated as $n3$ and an optical film thickness of the third layer is designated as $d3$ (nm),
a refractive index of the fourth layer is designated as $n4$ and an optical film thickness of the fourth layer is designated as $d4$ (nm),
a refractive index of the fifth layer is designated as $n5$ and an optical film thickness of the fifth layer is designated as $d5$ (nm),
a refractive index of the sixth layer is designated as $n6$ and an optical film thickness of the sixth layer is designated as $d6$ (nm),
a refractive index of the seventh layer is designated as $n7$ and an optical film thickness of the seventh layer is designated as $d7$ (nm),
a refractive index of the eighth layer is designated as $n8$ and an optical film thickness of the eighth layer is designated as $d8$ (nm),
a refractive index of the ninth layer is designated as $n9$ and an optical film thickness of the ninth layer is designated as $d9$ (nm), and
a maximum value of a difference in the refractive index between adjoining layers for layers 1 through 8 is designated as $\Delta n$,
the following conditions are satisfied, $1.60 \leq n1 \leq 1.70$, 15 nm $\leq d1 \leq 140$ nm, $2.00 \leq n2 \leq 2.40$, 20 nm $\leq d2 \leq 120$ nm, $1.60 \leq n3 \leq 1.70$, 11 nm $\leq d3 \leq 70$ nm, $2.00 \leq n4 \leq 2.40$, 20 nm $\leq d4 \leq 165$ nm, $1.60 \leq n5 \leq 1.70$, 15 nm $\leq d5 \leq 45$ nm, $2.00 \leq n6 \leq 2.40$, 90 nm $\leq d6 \leq 175$ nm, $1.60 \leq n7 \leq 1.70$, 50 nm $\leq d7 \leq 110$ nm, $2.00 \leq n8 \leq 2.40$, 20 nm $\leq d8 \leq 50$ nm, $1.20 \leq n9 \leq 1.28$, 140 nm $\leq d9 \leq 160$ nm, and $0.40 \leq \Delta n \leq 0.67$.

2. The anti-reflection film according to claim 1, wherein a refractive index of the substrate regarding light having a wavelength of 550 nm is designated as nk, and the following conditions are satisfied, $1.48 \leq nk \leq 2.15$.

3. The anti-reflection film according to claim 1, wherein a maximum value of the reflective index regarding light having wavelengths between 420 to 760 nm regarding an angle of incidence of 0 degrees is no more than 0.1%.

4. The anti-reflection film according to claim 1, wherein the first layer through the ninth layer are made from three types of layers all having a different refractive index.

5. The anti-reflection film according to claim 4, wherein the three types of layers are configured including a layer with a high refractive index between 2.00 to 2.40 made from either a single oxide or a mixture of oxides from among titanium, tantalum, zirconium, chromium, niobium, cerium, hafnium, and yttrium,
a layer with a medium refractive index between 1.60 to 1.70 made from a single oxide of or a mixture containing oxide alumina,
and a layer with a low refractive index between 1.20 to 1.28 made from a single oxide of or a mixture containing silicon oxide.

6. The anti-reflection film according to claim 1, wherein the ninth layer includes hollow fine particles of which a main component is silica.

7. The anti-reflection film according to claim 1, wherein the first layer is made from a single oxide of or a mixture containing $Al_2O_3$.

8. The anti-reflection film according to claim 1, wherein the eighth layer is made from one or a mixture of the following oxides, titanium, tantalum, zirconium, chromium, niobium, cerium, hafnium, and yttrium.

9. The anti-reflection film according to claim 1, wherein the ninth layer is manufactured by a sol-gel process, and the other layers are manufactured by either vacuum vapor deposition or sputtering.

10. An optical element comprising:
a substrate; and
an anti-reflection film formed on the substrate,
wherein the anti-reflection film includes a first layer, a second layer, a third layer, a fourth layer, a fifth layer, a sixth layer, a seventh layer, an eighth layer, and a ninth layer disposed in order from the substrate, wherein regarding light having a wavelength of 550 nm, assuming that a refractive index of the first layer is designated as n1 and an optical film thickness of the first layer is designated as d1 (nm), a refractive index of the second layer is designated as n2 and an optical film thickness of the second layer is designated as d2 (nm), a refractive index of the third layer is designated as n3 and an optical film thickness of the third layer is designated as d3 (nm), a refractive index of the fourth layer is designated as n4 and an optical film thickness of the fourth layer is designated as d4 (nm), a refractive index of the fifth layer is designated as n5 and an optical film thickness of the fifth layer is designated as d5 (nm), a refractive index of the sixth layer is designated as n6 and an optical film thickness of the sixth layer is designated as d6 (nm), a refractive index of the seventh layer is designated as n7 and an optical film thickness of the seventh layer is designated as d7 (nm), a refractive index of the eighth layer is designated as n8 and an optical film thickness of the eighth layer is designated as d8 (nm), a refractive index of the ninth layer is designated as n9 and an optical film thickness of the ninth layer is designated as d9 (nm), and a maximum value of a difference in the refractive index between adjoining layers for layers 1 through 8 is designated as $\Delta n$, the following conditions are satisfied, $1.60 \le n1 \le 1.70$, $15 \text{ nm} \le d1 \le 140 \text{ nm}$, $2.00 \le n2 \le 2.40$, $20 \text{ nm} \le d2 \le 120 \text{ nm}$, $1.60 \le n3 \le 1.70$, $11 \text{ nm} \le d3 \le 70 \text{ nm}$, $2.00 \le n4 \le 2.40$, $20 \text{ nm} \le d4 \le 165 \text{ nm}$, $1.60 \le n5 \le 1.70$, $15 \text{ nm} \le d5 \le 45 \text{ nm}$, $2.00 \le n6 \le 2.40$, $90 \text{ nm} \le d6 \le 175 \text{ nm}$, $1.60 \le n7 \le 1.70$, $50 \text{ nm} \le d7 \le 110 \text{ nm}$, $2.00 \le n8 \le 2.40$, $20 \text{ nm} \le d8 \le 50 \text{ nm}$, $1.20 \le n9 \le 1.28$, $140 \text{ nm} \le d9 \le 160 \text{ nm}$, and $0.40 \le \Delta n \le 0.67$.

11. The optical element according to claim 10, wherein a refractive index of the substrate regarding light having a wavelength of 550 nm is designated as nk, and the following conditions are satisfied, $1.48 \le nk \le 2.15$.

12. An optical system comprising:

an optical element including
a substrate, and
an anti-reflection film formed on the substrate; and a variable diaphragm, wherein the anti-reflection film includes a first layer, a second layer, a third layer, a fourth layer, a fifth layer, a sixth layer, a seventh layer, an eighth layer, and a ninth layer disposed in order from the substrate, wherein regarding light having a wavelength of 550 nm, assuming that a refractive index of the first layer is designated as n1 and an optical film thickness of the first layer is designated as d1 (nm), a refractive index of the second layer is designated as n2 and an optical film thickness of the second layer is designated as d2 (nm), a refractive index of the third layer is designated as n3 and an optical film thickness of the third layer is designated as d3 (nm), a refractive index of the fourth layer is designated as n4 and an optical film thickness of the fourth layer is designated as d4 (nm), a refractive index of the fifth layer is designated as n5 and an optical film thickness of the fifth layer is designated as d5 (nm), a refractive index of the sixth layer is designated as n6 and an optical film thickness of the sixth layer is designated as d6 (nm), a refractive index of the seventh layer is designated as n7 and an optical film thickness of the seventh layer is designated as d7 (nm), a refractive index of the eighth layer is designated as n8 and an optical film thickness of the eighth layer is designated as d8 (nm), a refractive index of the ninth layer is designated as n9 and an optical film thickness of the ninth layer is designated as d9 (nm), and a maximum value of a difference in the refractive index between adjoining layers for layers 1 through 8 is designated as $\Delta n$, the following conditions are satisfied, $1.60 \le n1 \le 1.70$, $15 \text{ nm} \le d1 \le 140 \text{ nm}$, $2.00 \le n2 \le 2.40$, $20 \text{ nm} \le d2 \le 120 \text{ nm}$, $1.60 \le n3 \le 1.70$, $11 \text{ nm} \le d3 \le 70 \text{ nm}$, $2.00 \le n4 \le 2.40$, $20 \text{ nm} \le d4 \le 165 \text{ nm}$, $1.60 \le n5 \le 1.70$, $15 \text{ nm} \le d5 \le 45 \text{ nm}$, $2.00 \le n6 \le 2.40$, $90 \text{ nm} \le d6 \le 175 \text{ nm}$, $1.60 \le n7 \le 1.70$, $50 \text{ nm} \le d7 \le 110 \text{ nm}$, $2.00 \le n8 \le 2.40$, $20 \text{ nm} \le d8 \le 50 \text{ nm}$, $1.20 \le n9 \le 1.28$, $140 \text{ nm} \le d9 \le 160 \text{ nm}$, and $0.40 \le \Delta n \le 0.67$.

13. The optical system according to claim 12, wherein a refractive index of the substrate regarding light having a wavelength of 550 nm is designated as nk, and the following conditions are satisfied, $1.48 \le nk \le 2.15$.

* * * * *